Oct. 1, 1957  R. F. FRANK  2,807,965
VARIABLE SPEED TRANSMISSION
Filed March 31, 1955
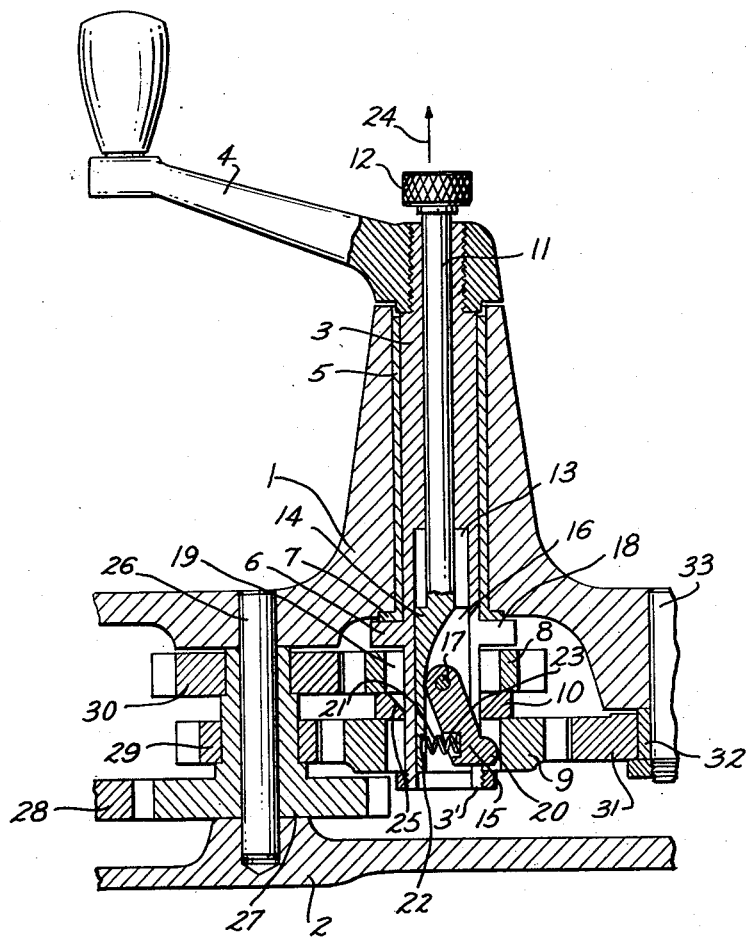
INVENTOR.
Roger Felix Frank
BY
Michael S. Striker
agt.

United States Patent Office 2,807,965
Patented Oct. 1, 1957

2,807,965

VARIABLE SPEED TRANSMISSION

Roger Felix Frank, Cluses, France, assignor to Etablissements Frank & Pignard, Cluses, France Application March 31, 1955, Serial No. 498,378

Claims priority, application France April 12, 1954

1 Claim. (Cl. 74—371)

The present invention relates to a variable speed transmission.

More particularly, the present invention relates to transmissions of the type used, for example, in fishing reels.

Transmissions of the above type are usually driven manually. In order to operate devices driven through such transmissions at different speeds it is necessary for the operator to drive the device slowly or rapidly which is a great inconvenience.

One of the objects of the present invention is to overcome the above drawbacks by providing a variable speed transmission usable in devices of the above type so that different speeds may be obtained without requiring the operator to provide speed variations through the manner in which he operates the device.

Another object of the present invention is to provide a variable speed transmission of the above type capable of being used in devices such as fishing reels and having an adjustment which may be conveniently set by the operator to vary the transmission speed.

It is also an object of the present invention to provide an apparatus capable of accomplishing the above objects and at the same time being made up of simple and ruggedly constructed parts which are easy and inexpensive to manufacture and assemble and which are very reliable in operation.

With the above objects in view the present invention mainly consists of a variable speed transmission which includes a support means and an axialy bored shaft turnably carried by the support means and having a portion formed with a longitudinally extending cutout communicating with the bore of the shaft and extending to the outer surface of the shaft. A pair of motion transmitting members of different sizes are freely turnable with respect to the shaft and are located over the cutout thereof, and a manually operable means is shiftable along the shaft thereof in the bore thereof and extends through the cutout thereof for selectively placing the shaft in driving engagement with one of these transmission members.

The novel features which are considered as characteristic for the invention are set forth in particular in the appended claim. The invention itself, however, both as to its construction and its method of operation, together with additional objects and advantage thereof, will be best understod from the following description of specific embodiments when read in connection with the accompanying drawing.

Part of a fishing reel is shown by way of example only in the drawing, and the plane on which the section of the drawing is taken extends through a central part of the drive shaft of the fishing reel shown in the drawing.

The drawing shows fragmentarily a housing 1 of a fishing reel or the like, and this housing 1 is closed by a cover 2 in any known way. A tubular extension of the housing 1 accommodates an axially bored drive shaft 3 which extends beyond the housing 1 to the exterior thereof where this shaft 3 is fixed to a hand crank 4 so that the shaft 3 may be turned about its axis manually. The shaft 3 is supported for rotation by an elongated bushing 5 located between the shaft 3 and the housing 1, and it will be seen that the shaft 3 includes an annular flange 6 engaging an end flange 7 of the bushing 5 so that the flange 6 on the one hand and the cooperation between crank 4 and an end face of the housing 1 on the other hand prevent axial shifting of the shaft 3 and limit the latter to angular rotation about its axis. A pair of transmission members 8 and 9 of different sizes are freely turnable on the shaft 3 within the housing 1. In the illustrated example these transmission members are in the form of gears which are axially spaced along the shaft 3 by the annular spacer member 10 through which the shaft 3 extends and which is located between the gears 8 and 9 as shown in the drawing.

A means is provided for enabling the operator to selectively place the shaft 3 in driving engagement with one or the other of the gears 8 or 9 and this means includes the rod 11 which is located in and slidable along the axial bore of the shaft 3. This rod 11 is provided at its outer free end which extends beyond the crank 4 with an enlargement 12 conveniently accessible to the operator so that the rod 11 may be easily shifted axially along the shaft 3. It will be noted that the axial bore of shaft 3 is enlarged at the inner portion of shaft 3 to provide the chamber 13, and an enlarged and inner end portion 14 of the rod 11 is slidable within the chamber 13.

A pawl 15 is turnable within a longitudinally extending cutout 16 formed in the enlarged portion 14 of rod 11, the pawl 15 being turnable about the pivot pin 17 carried by the rod 11 and extending into and through a longitudinally extending cutout 18 formed in the shaft 3 and communicating with the chamber 13 of the bore thereof as well as with the outer surface of the shaft 3, as indicated in the drawing. The gears 8 and 9 are each formed with one or more keyways 19 which in a given angular position with respect to the shaft 3 communicate with the cutout 18 thereof. The pawl 15 is provided with a convexly curved free end 20 which extends into the keyway 19 of one or the other of the gears 8 or 9. A spring 21 extends at one end into a recess 22 formed in the rod 11 and at its opposite end into a recess 23 formed in the pawl 15 to urge this pawl outwardly toward the gears 8 or 9.

In the position of the parts shown in the drawing, when the operator turns the hand crank 4 the shaft 3 will turn therewith, and because the pawl 15 extends into the longitudinally extending cutout 18 of shaft 3 the rod 11 is constrained to rotate together with the shaft 3. Furthermore, it will be noted that the end 20 of the pawl 15 extends into a keyway 19 of the gear 9 so that this gear 9 rotates together with the shaft 3 in the position of the parts shown in the drawing. Should the operator wish to change the speed of the transmission, then it is only necessary for the operator to grasp the enlargement 12 and shift the rod 11 in the direction of the arrow 24 in order to place the pawl 15 in alignment with the gear 8 which is of a smaller diameter than the gear 9 in the example illustrated. The upper end of the enlargement 14 of rod 11 cooperates with the outer end of the chamber 13, as viewed in the drawing, to accurately locate the pawl 15 in a proper position to cooperate with the gear 8, and with the parts in this latter position after the shaft 3 turns through a part of a revolution the pawl 15 will become aligned with one of the keyways 19 of the gear 8 to snap into this keyway and place the shaft 3 in driving engagement with the gear 8. To turn the parts to the position shown in the drawing, it is only necessary to again shift the rod 11 in the direction opposite to the arrow 24 back to the position shown in the drawing, and it will be noted that the annular spacer 10 is provided with an inner face 25 which forms part of a cone so that the convexly curved end 20 of the pawl 15 easily moves over the spacer 10. A ring 3' is threaded on to the free end of shaft 3 to cooperate with the flange 6 for retaining gears 8 and 9 and spacer 10 in the desired axial position on the shaft 3.

In order to transmit the motion of members 8 and 9 to other parts of the device, a shaft 26 is carried by the housing 1 and cover 2 thereof in a position parallel to the shaft 3, and a gear 27 is freely turnable on the shaft 26 to cooperate with another gear 28 or the like for driving a desired element. The hub of the gear 27 is in the form of an elongated tube through which the shaft 26 extends, and gears 29 and 30 are fixed to this tube and respectively mesh with the gears 9 and 8. Thus, gears 27, 29 and 30 all rotate together about the axis of the shaft 26. With the position of the parts shown in the drawing the gear 27 will be turned with the transmission ratio given by the illustrated position of the rod 11, and it will be noted that at this time a drive is also transmitted through the gear 30 back to the gear 8 which turns freely with respect to the shaft 3. On the other hand, when pawl 15 extends into a keyway of the gear 8, a different transmission will be provided to the gear 27, and at this time the gear 9 will turn freely with respect to the shaft 3 due to the drive transmitted to the gear 9 through the gear 29.

In the illustrated example, the gear 9 additionally meshes with a gear 31 turnably supported by a bushing 32 on the shaft 33 carried by the housing 1, so that when the shaft 3 is in driving engagement with the gear 8 a drive is transmitted not only through the gear 27 and element 28, but also through the gear 9 and the gear 31 to any desired part of the device.

It will be understood that each of the elements described above, or two or more together, may also find a useful application in other types of variable speed transmissions differing from the types described above.

While the invention has been illustrated and described as embodied in a manually operable variable speed transmission, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed as new and desired to be secured by Letters Patent is:

Variable speed transmission for a fishing reel comprising, in combination, support means; an axially bored shaft turnably carried by said support means and having a portion formed with a longitudinally extending cutout communicating with the bore of said shaft and extending to the outer surface of said shaft; a pair of gears of different sizes located on said shaft over said cutout thereof and being freely turnable with respect to said shaft, each of said gears having a keyway located next to said shaft and communicating with said cutout thereof when said shaft is in a given angular position with respect to each gear; an elongated rod located slidably in the bore of said shaft and having a free end extending to the exterior of said shaft and accessible to the operator so that said rod may be manually shifted along said bore; an annular spacer located on said shaft between said gears, said spacer being formed on one side thereof next to said shaft with an inner annular surface which forms part of a cone and having on the other side thereof a flat surface substantially normal to said shaft; a pawl pivotally connected to said rod and having distant from said rod a free end extending into said cutout, said free end of said pawl having on one side a substantially square shoulder adapted to cooperate with said inner annular surface of said spacer and on the other side a convexly curved surface adapted to cooperate with said flat surface of said spacer; and a spring engaging said rod and pawl for urging said free end thereof outwardly through said cutout and into the keyway of one of said gears.

References Cited in the file of this patent

UNITED STATES PATENTS

| | | |
|---|---|---|
| 682,507 | Sweet | Sept. 10, 1901 |
| 1,171,853 | Kohl | Feb. 15, 1916 |
| 1,542,403 | Miles | June 16, 1925 |
| 2,549,490 | Kuhl | Apr. 17, 1951 |
| 2,698,545 | Pethybridge | Jan. 4, 1955 |

FOREIGN PATENTS

| | | |
|---|---|---|
| 163,057 | Great Britain | May 19, 1921 |